UNITED STATES PATENT OFFICE.

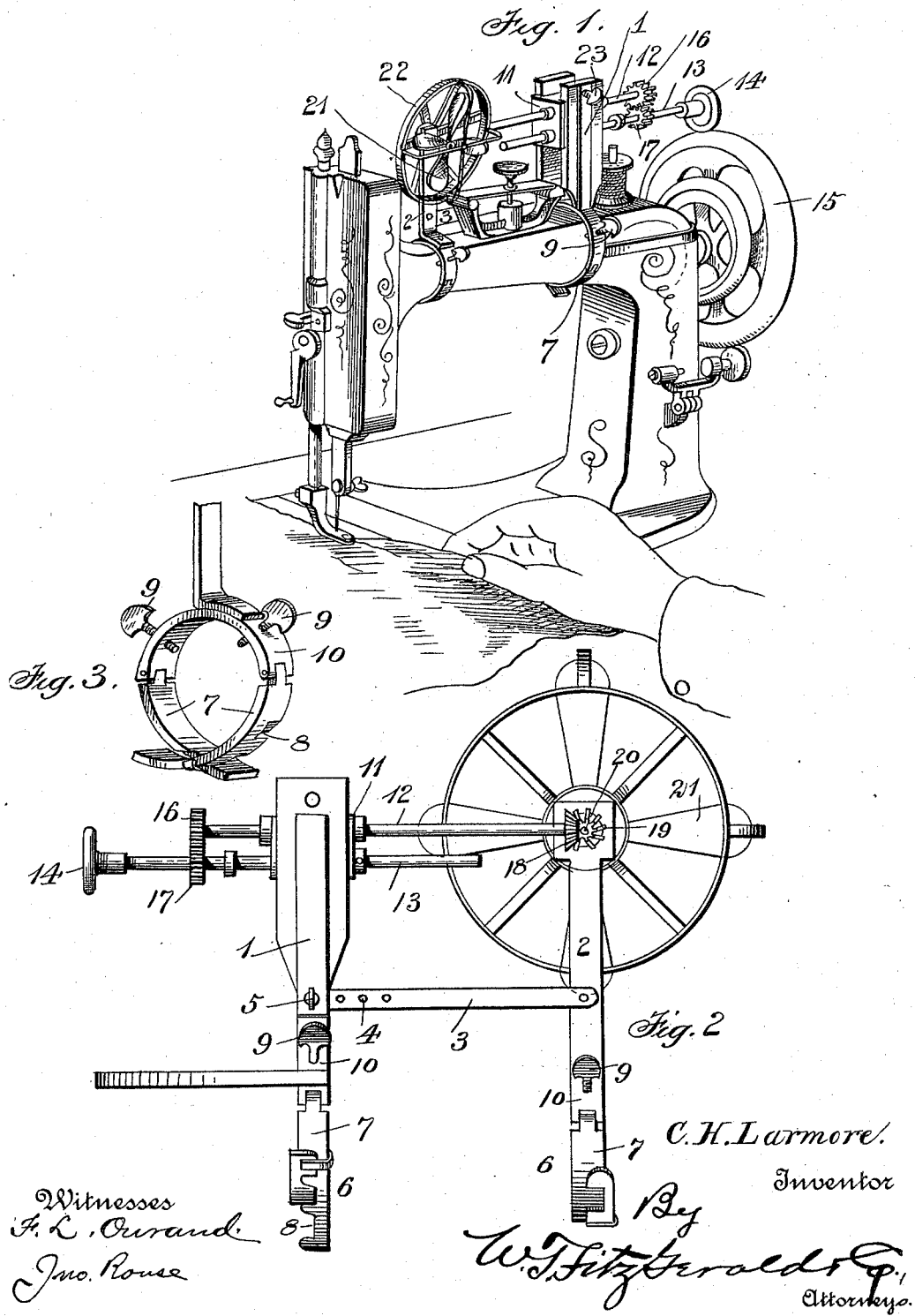

CHARLES H. LARMORE, OF PLATTSBURG, NEW YORK.

VENTILATING-FAN.

SPECIFICATION forming part of Letters Patent No. 586,046, dated July 6, 1897.

Application filed March 19, 1897. Serial No. 628,309. (No model.)

*To all whom it may concern:*

Be it known that I, CHARLES H. LARMORE, a citizen of the United States, residing at Plattsburg, in the county of Clinton and State of New York, have invented certain new and useful Improvements in Ventilating-Fans; and I do hereby declare the following to be a full, clear, and exact description of the invention, such as will enable others skilled in the art to which it appertains to make and use the same.

My invention consists of a ventilating-fan which is especially desirable for use in connection with a simple form of motor, as a sewing-machine or an electric battery of small volume, the object being to provide a fan particularly applicable for use upon a sewing-machine, whereby the power employed to operate said machine may be connected with the driving mechanism of the fan.

The essential feature of value, therefore, of my invention may be said to consist in providing a fan of simple character and adjustable securing mechanism therefor.

In the accompanying drawings, Figure 1 illustrates a perspective view of my invention as applied to use upon a sewing-machine. Fig. 2 is a side elevation, on a slightly-enlarged scale, illustrating the opposite side of the device shown in Fig. 1. Fig. 3 is a perspective detail of the locking-clamp or adjustable collar employed to anchor the fan and its supporting parts in position.

In carrying out my invention I provide the standards 1 and 2, adjustably connected together by the graduated bar 3, having a series of apertures 4, designed to be received by the thumb-screw 5, suitably mounted in the standard 1. The other end of the bar 3 is pivoted to the standard 2, while to the lower ends of each of the standards I firmly secure the adjustable collar or clamp 6. Said clamp consists of a series of pivoted members 7, having the edge notches 8, one notch being designed to receive a similarly-formed notch upon a contiguous overlapping member.

The clamp is placed around the object to which it is designed to be attached and one of the notches 8 caused to enter a notch upon a desired member forming the other end of the clamp, and when thus placed in position the collar may be more tightly secured by the thumb-screws 9, which are seated in threaded apertures provided in the upper member 10, the ends thereof taking entirely through the same into engagement with the arm of the sewing-machine or other object to which it is affixed.

I prefer to form the standard 1 in two parts, and between the same I mount the adjustable block 11, in which are provided suitable bearings for the operating-shafts 12 and 13, the last-mentioned shaft extending laterally sufficiently to permit the friction-wheel 14, secured thereon, to operatively contact with the hand-wheel 15 of the sewing-machine. Near the outer ends of said shafts I also provide the gears 16 and 17, the latter, with its accompanying shaft 13, being designed to be reciprocated out of or into engagement with the gear 16 when it is not desired to operate the fan.

Upon the inner end of the shaft 12 I mount the bevel-gear 18, designed to mesh with the bevel-gear 19, secured to the shaft 20. Said shaft 20 is provided with suitable bearings in the standard 2 and extends entirely through the same, the free end being received by an aperture provided in the fan proper, 21.

The fan, it will be understood, may be of any desired construction and is preferably inclosed by the protector or housing 22, formed of wire or other suitable material. The bearing-block 11 is adjusted vertically between the members forming the standard 1 by means of the set-screw 23, substantially as shown.

It is believed that the construction and operation of my invention will be made fully apparent from the foregoing description and further reference is deemed unnecessary.

Having thus fully described the construction and operation of my invention, what I claim as new, and desire to secure by Letters Patent, is—

1. The herein-described adjustable fan for sewing-machines or the like, consisting of the standards 1 and 2; the bearing-block 11 and the adjustable clamp affixed to the standards and designed to encircle and positively engage the arm of the machine or other object, and means for positively anchoring said clamp in position, substantially as described and for the purpose set forth.

2. The herein-described ventilating-fan consisting of a fan rotatably mounted in the standard 2; an adjustable bearing-block secured between the members of the standard 1; shafts mounted in said bearing-block, one of which is designed to be reciprocated therein, while the other is operatively connected with the fan and the shaft 13, and means, substantially as described, for anchoring the standards in an adjusted position, as and for the purpose set forth.

In testimony whereof I affix my signature in presence of two witnesses.

CHARLES H. LARMORE.

Witnesses:
 JOHN RULE,
 ADRIAN M. BOURDON.